2 Sheets—Sheet 1.
J. W. & A. RUGER.
Cake-Machine.
No. 216,461. Patented June 10, 1879.
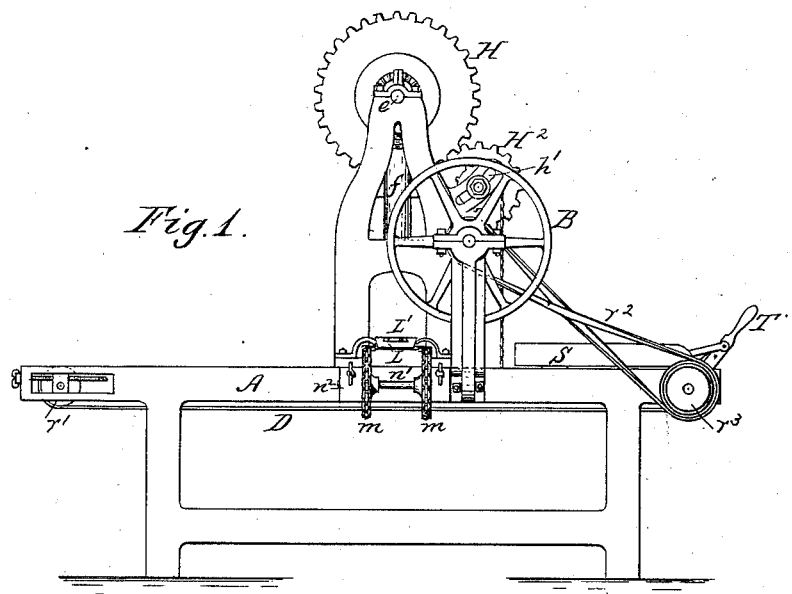
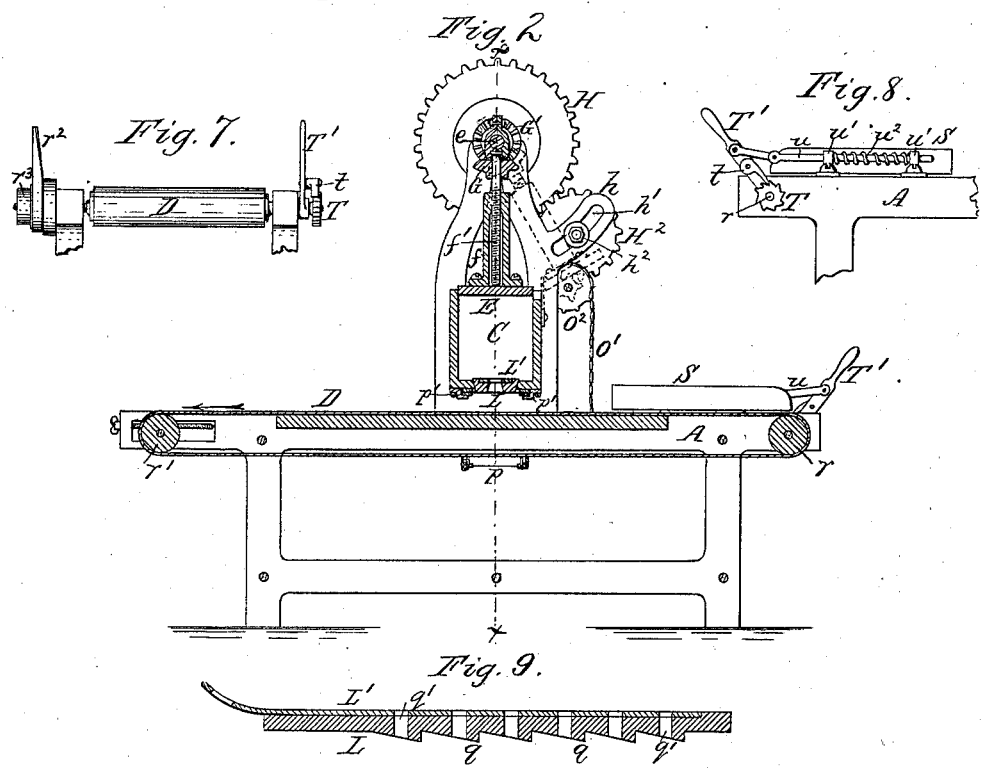
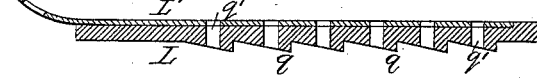
Witnesses:
Chas. F. Buchheit
Edw. J. Brady
J. W. Ruger
A. Ruger Inventors.
By Wilhelm & Bonner
Attorneys.

2 Sheets—Sheet 2.
J. W. & A. RUGER.
Cake-Machine.
No. 216,461. Patented June 10, 1879.
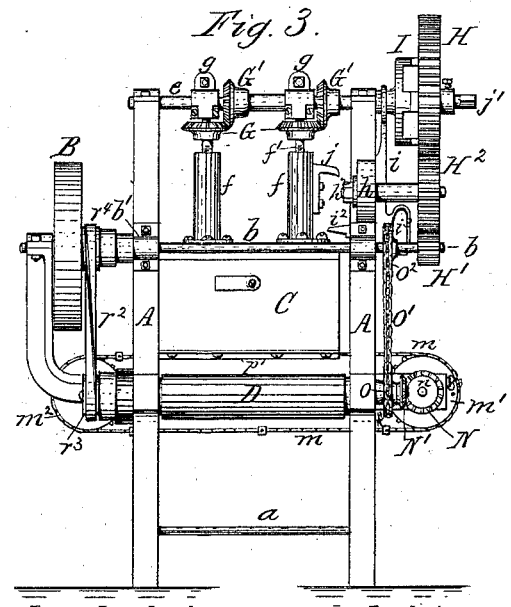
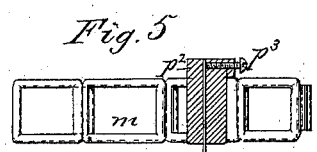
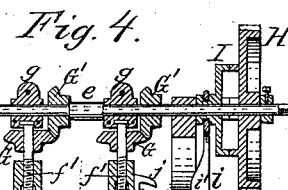
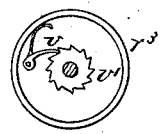
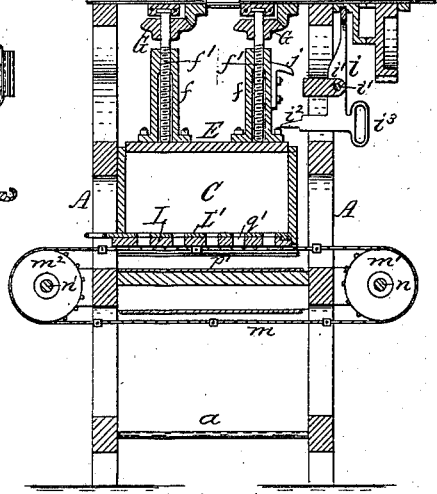
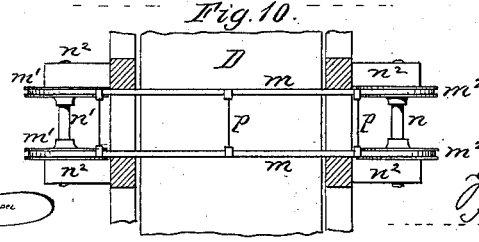

UNITED STATES PATENT OFFICE.

JAMES W. RUGER AND AUGUSTUS RUGER, OF BUFFALO, NEW YORK.

IMPROVEMENT IN CAKE-MACHINES.

Specification forming part of Letters Patent No. 216,461, dated June 10, 1879; application filed December 18, 1878.

*To all whom it may concern:*

Be it known that we, JAMES W. RUGER and AUGUSTUS RUGER, both of the city of Buffalo, in the county of Erie, in the State of New York, have invented new and useful Improvements in Cake-Machines, of which the following is a specification, reference being had to the accompanying drawings.

This invention relates to that class of machines which are employed for making cakes from soft dough, and which are provided with a dough-box having perforations in its bottom, through which the soft dough is forced by means of a follower or plunger, and cut up into cakes by means of a suitable cutting device.

Previous to our invention reciprocating, rotary, and oscillating cutters have been used in machines of this description. Reciprocating and other cutters which operate both ways are objectionable for the reason that the cakes produced by them are tapering in the direction of movement of the cutters, or thicker at one side than on the other, while oscillating and rotating cutters which operate only one way are quite complicated in construction.

The principal object of our invention is the construction of a cutting mechanism of simple construction which shall produce cakes of uniform thickness; and to that end our invention consists, principally, of an endless apron, band, chain, or equivalent device provided with cutters and arranged transversely under the dough-box, whereby the bars of dough issuing out of the perforations in the bottom of the dough-box are cut up into cakes of uniform thickness by the successive action of the cutters, all traveling in the same direction.

Our invention consists, also, of various details of construction for rendering the operation of the machine more certain and reliable.

In the accompanying drawings, consisting of two sheets, Figure 1 is a side elevation, Fig. 2 a longitudinal section, and Fig. 3 an end elevation, of a machine provided with our improvements. Fig. 4 is a cross-section in line $x\ x$, Fig. 2. Fig. 5 is a partly-sectional plan view, and Fig. 6 a sectional elevation, of a portion of the cutter mechanism. Fig. 7 is an end view of the endless apron and the mechanism for adjusting it. Fig. 8 is a fragmentary side elevation thereof. Fig. 9 is a sectional view of the bottom of the dough-box. Fig. 10 is a plan view of the cutter mechanism, and Fig. 11 is a view of the driving-pulley of the endless apron.

Like letters of reference designate like parts in the several figures.

A represents the side frames of the machine, connected by suitable cross-stays $a$. $b$ is the driving-shaft, supported in bearings $b'$; and B, the driving-pulley, mounted on one end of the shaft $b$.

C is the dough-box, secured between the upper portions of the side frames, A, and D is the endless feed-apron, arranged longitudinally between the lower portions of the frame A.

E is the follower or plunger, fitting snugly in the dough-box C, and $e$ is a horizontal shaft, arranged transversely above the dough-box C, for operating the plunger E. The latter is provided with two screw-sleeves, $f$, projecting upwardly, and engaging with two feed-screws, $f'$, which work in the threaded upper portions of the sleeves $f$, and are held by means of heads at their upper ends in bearings $g$, hung loosely on the shaft $e$.

G represents a bevel-wheel secured to the upper end of each screw $f'$, and G' two similar wheels mounted on the shaft $e$, to mesh with the wheels G, so that by rotating the shaft $e$ in the proper direction the plunger will be forced down.

H is a gear-wheel secured to one end of the shaft $e$, and H¹, a removable pinion mounted on the driving-shaft $b$. H² is an idler-wheel interposed between the pinion H¹ and the wheel H, for communicating motion from the former to the latter. The wheel H² turns loosely on an arbor, $h$, the inner end of which is held in a slot, $h¹$, by means of a screw-nut, $h²$. The slot $h¹$ is curved concentric with the wheel H, so that upon removing the pinion H¹ and substituting a larger or smaller one, the position of the interposed wheel H² can be so changed as to gear properly with the pinion H¹ and wheel H. By increasing the size of the pinion H¹ the speed of the plunger E is increased, and the thickness of the cakes produced is increased accordingly. By using a smaller pinion the reverse result is produced.

I is a clutch-coupling arranged on the inner side of the wheel H, and $i$ the shifting-lever pivoted to the side frame, A, at $i^1$, and having its lower end provided with an inwardly-projecting finger, $i^2$, and an outer handle, $i^3$.

$j$ is a claw or finger attached to the adjacent screw-sleeve $f$ at such a point that when the plunger E has almost reached the bottom of the dough-box, the claw $j$ will force the lower arm of the lever $i$ outward, and thereby disengage the coupling I and arrest the downward motion of the follower. The latter can now be raised by simply turning the hand-crank $j'$, secured to the outer end of the shaft $e$. The coupling I is also readily shifted by hand in any desired position of the follower. When the latter has been raised out of the dough-box C to a point at which the lower ends of the screws $f'$ strike against the follower, the rotary movement of the screws $f'$ is arrested, and upon continuing to turn the crank $j'$ the follower is swung up away from the dough-box, so as to permit access to the latter.

L is the removable bottom of the dough-box, sliding in grooves or ways in the lower portion of the dough-box, and provided with openings shaped to produce cakes of the desired form. L' is a slide arranged upon the bottom L, and provided with openings registering with those of the bottom L, so that the openings of the latter can be opened and closed by adjusting the slide L'.

$m\ m$ represent the two endless bands or chains of the cutting mechanism, arranged transversely underneath the dough-box, and running over a pair of pulleys, $m^1\ m^1$ and $m^2\ m^2$, on each side of the machine. These pulleys are mounted on shafts $n\ n^1$, supported in bracket-bearings $n^2$. The shaft $n$ is provided with a bevel-wheel, N, meshing with a bevel-pinion, N', which latter is secured to a band-pulley, O, which turns with the pinion N' on a stud or arbor secured to the side frame. $O^1$ is an endless belt or chain running over the pulley O, and a similar pulley, $O^2$, mounted on the driving-shaft $b$. By this means motion is transmitted from the driving-shaft to the endless bands or chains of the cutter mechanism.

$p$ are cutting-wires arranged at suitable distances apart between the endless chains or bands $m\ m$, so as to run in close contact with the bottom of the dough-box C, thereby dividing the bars of dough issuing from the orifices of the dough-box into cakes of the desired thickness.

$p^1$ are parallel guides, ways, or grooves, which may be arranged on the under side of the bottom of the dough-box, for guiding the upper portions of the endless bands or chains $m$, and keeping the cutting-wires in close contact with the bottom of the dough-box. The latter may be provided on its under side with inclines $q$, which depress the cutting-wire as it passes each discharge-opening $q'$, and then permit the wire to spring suddenly back against the bottom of the dough-box, whereby the wires are jarred, and the soft cakes prevented from adhering to the wires.

When endless chains are used in the cutter mechanism, the wires $p$ may be secured to the chains by inserting them in a perforated block, $p^2$, cast with or secured to the respective chain-links, the ends of the wires being clamped in the perforations of the blocks by set-screws $p^3$, as clearly shown in Figs. 5 and 6.

Any other suitable means for fastening the wires to the endless bands or chains may, however, be employed.

$r\ r^1$ represent the rollers over which the endless feed-apron runs. The roller $r$ is driven from the driving-shaft $b$ by an endless belt, $r^2$, running over cone-pulleys $r^3\ r^4$, so as to move the apron D in the direction of the arrow, Fig. 2.

S is a gage strip or plate secured to one of the side frames, A, parallel with the apron D, for facilitating the proper arrangement on the feed-apron of the pans which receive the cakes as they are detached by the cutters. These pans are all made of uniform length, and the gage-plate S is arranged in such manner that when the outer edge of the pan is in line with the outer end of the plate S the inner edge of the pan will be just underneath the discharge-orifices of the dough-box. In this position of the pan some of the cakes would drop upon the raised rim or flange of the pan and be spoiled; and to avoid this it becomes necessary to move the pan rapidly forward a sufficient distance to remove the raised flange of the pan from under the dough-box. This is accomplished by the following mechanism:

T is a ratchet-wheel secured to the end of the driving-roller $r$ of the endless apron D, and T' a hand-lever hung loosely on the shaft of the roller $r$, and provided with a pawl, $t$, engaging with the ratchet-wheel T, so as to turn the roller $r$ in the direction of the feed-motion of the apron D, but not in the opposite direction. $u$ is a rod or bar connected with the lever T' and guided in bearings $u^1$, secured to one of the side frames, A, and $u^2$ is a spiral spring arranged upon the bar $u$ and between the bearings $u^1$ in such manner as to hold the lever T' in its rearmost position. By moving the lever T' forward when the rear edge of the pan reaches the rear end of the gage-bar S the feed-apron D, with the pans resting thereon, is instantly moved forward a sufficient distance to prevent any cakes from falling on the raised rim of the pan, and upon releasing the lever T' it is returned to its former position by the spring $u^2$. The pulley $r^3$ is preferably mounted loosely on the shaft of the roller $r$ and connected therewith by a pawl, $v$, and ratchet-wheel $v'$, in such manner as to permit the roller $r$ to be moved forward by the lever T' without accelerating the motion of the pulley $r^3$.

In operating our improved machine the plunger E is first raised out of the dough-box and swung out of the way. The openings in the bottom of the dough-box are then closed by the slide L', the dough introduced into the dough-box, and the plunger reinserted and the machine started, so as to cause the plunger to descend in the dough-box. In order to save time when the dough-box is not quite filled with dough, the coupling I can be released, and the plunger lowered rapidly by hand until it reaches the dough, when the coupling is thrown into gear, and the further movement of the plunger effected by the operation of the machine. When the dough has been compressed to the required consistency the slide L' is opened, when the dough issues from the orifices $q'$ in the bottom and is cut up into cakes by the wires $p$. The latter having a uniform movement in the same direction, they cut up the dough into cakes of uniform thickness at a rapid rate, turning out none but perfect cakes and avoiding all waste. The thickness of the cakes produced is readily changed by changing the pinion H, and the machine is otherwise readily regulated and adapted to the requirements of the articles intended to be produced.

We claim as our invention—

1. The combination, with the dough-box C and plunger E, of a cutter mechanism composed of the endless chains or bands $m$ $m$ and cutters $p$, substantially as and for the purpose set forth.

2. A dough-box having its bottom provided with inclines $q$, for jarring the cutters, substantially as set forth.

3. The combination, with the plunger E, provided with screw-sleeves $f$, and the gear-wheel H, having a clutch-coupling, I, of the shifting-lever $i$, provided with finger $i^2$, and the claw $j$, secured to the sleeve $f$, for releasing the coupling, substantially as set forth.

4. The combination, with the roller $r$ and endless apron D, of the ratchet-wheel T, hand-lever T', having pawl $t$, and gage-plate S, substantially as and for the purpose set forth.

JAMES W. RUGER.
AUGUSTUS RUGER.

Witnesses:
   JNO. J. BONNER,
   EDW. J. BRADY.